J. E. Nesen.
Harvester Rake.
Nº 10314          Patented Dec. 13, 1853.
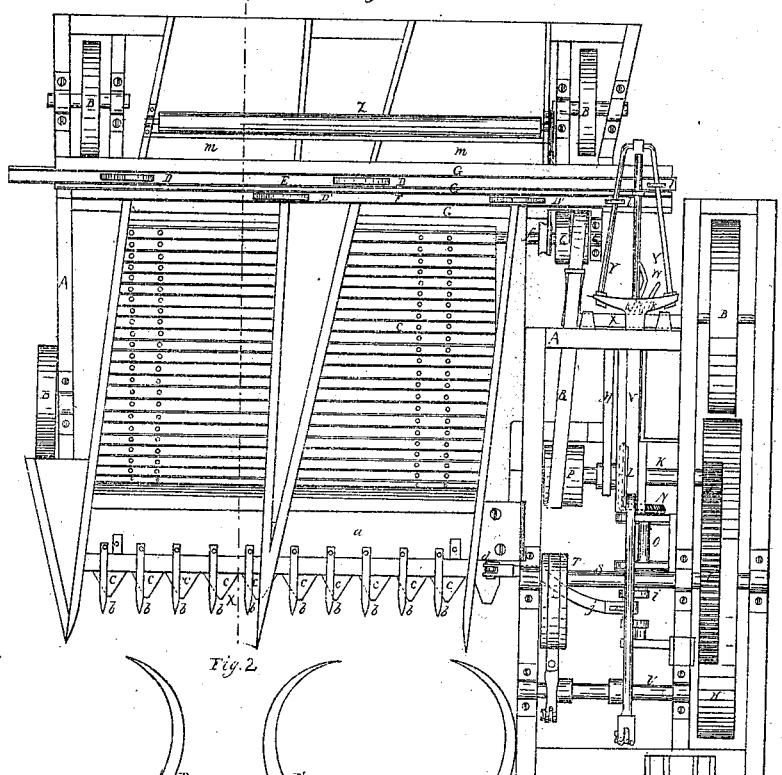
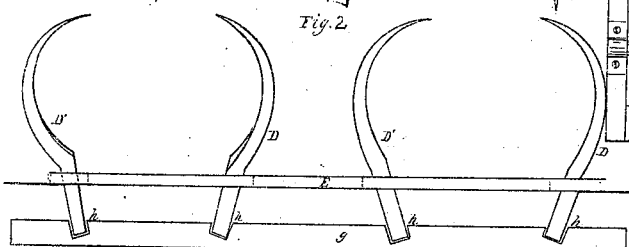
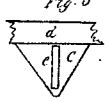
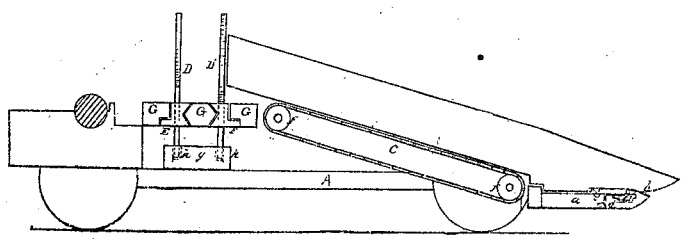

UNITED STATES PATENT OFFICE.

JOSEPH E. NESEN, OF BUFFALO, NEW YORK.

IMPROVEMENT IN HARVESTERS AND BINDERS.

Specification forming part of Letters Patent No. 10,314, dated December 13, 1853.

*To all whom it may concern:*

Be it known that I, JOSEPH E. NESEN, of Buffalo, in the county of Erie and State of New York, have invented certain new and useful Improvements in Reaping and Mowing Machines; and I do hereby declare that the following is a full, clear, and exact description of the construction and operation of the same, reference being had to the annexed drawings, making a part of this specification, in which—

Figure 1 is a plan or top view of my improved reaping-machine. Fig. 2 is a detached view of the binding-hooks. Fig. 3 is a side view of one of the fingers. Fig. 4 is a vertical section of the machine, taken at the line $x$ $x$, Fig. 1. Fig. 5 is an under view of one of the teeth, showing the projection on its under side.

Similar letters of reference indicate corresponding parts in each of the several figures.

First. My invention consists in the employment or use of an endless apron having an intermitting motion for the purpose of conveying the grain in proper quantity to the binding-hooks.

Second. My invention consists in gathering in bundles, by means of binding-hooks, the grain cut by the reaper, said grain being carried up to the hooks by the endless apron. The binding-hooks are operated by means of slides having a reciprocating motion, as will be fully shown hereinafter.

Third. My invention consists in the combination of the binding-hooks and endless apron.

To enable others skilled in the art to make and use my invention, I will proceed to describe its construction and operation.

A represents the frame of the machine, supported on wheels B. To the front cross-piece, $a$, of the frame there are attached fingers $b$, having slots through them, through which slots the teeth $c$ work, as seen more particularly in Fig. 3. The teeth $c$ are of triangular form, and are attached to a bar, $d$, which also passes through the slots of the fingers. On the under surface of each tooth there is a rib or projection, $e$. (See Figs. 3, 4, and 5.) The ribs or projections also work through the slots and prevent the straw from choking the teeth and fingers. The teeth $c$ and bar $d$ have a reciprocating motion, and as the ribs or projections work through the slots the fingers are kept perfectly free and clean from straw, and the clogging of the teeth is thereby effectually prevented.

C is an endless apron, which passes over the rollers $ff$. This apron is inclined, as will be seen by referring to Fig. 4, and has an intermitting motion. The manner in which motion is communicated to the belt will be presently explained.

D D D′ D′ are binding-hooks placed directly back of the endless apron. The lower ends of these hooks fit in recesses $h$ in a cross-piece, $g$, of the frame A. (See Figs. 2 and 4.) The form of the hooks may be seen in Fig. 2. The hooks pass through slides E F, which have a horizontal reciprocating motion, and work in stationary grooved strips G G G. (See Figs. 1 and 4.) The hooks D D pass through the slide E and the hooks D′ D′ pass through the slide F. The slides have an opposite motion—that is, when one of them is moving to the right the other is moving to the left, and consequently each pair of hooks as the slides operate are brought together and moved from each other, a hook D and a hook D′ forming a pair.

Motion is communicated to the working parts from the wheel H, which rests upon the ground. This wheel H has a toothed wheel, I, attached permanently to it, which meshes into a pinion, J, on a shaft, K, (see Fig. 1,) the toothed wheel I and pinion J being shown in red. The shaft K has a beveled pinion, L, upon it, which may be attached to the shaft or detached from it by means of a lever, M, the boss of the wheel having a groove which works over a feather on the shaft. The beveled pinion L meshes into a beveled pinion, N, on a shaft, O, which has a crank, $i$, at one end, and which crank gives a reciprocating motion to a connecting-rod, $j$, attached to the tooth-bar $d$. Thus it will be seen how the reciprocating motion is given the tooth-bar.

P is a pulley on the shaft K, and Q Q′ are pulleys on the upper shaft, $f$, of the endless apron. The pulley Q is an idle-pulley, or hung loosely on the shaft. The pulley Q′ is attached to the shaft and revolves with it. R is a belt which passes around the pulley P and around the pulleys Q Q′ alternately.

S is a shaft on which the wheel H is hung. This shaft has an eccentric, T, upon it, which eccentric communicates motion to a rock-shaft, U, which gives a reciprocating motion to a slide or bar, V, having two small pins, k k, projecting downward from its under surface. (See dotted lines.) These small pins work in a curved slotted lever, W, attached to a belt-shipper, X. As the slide or bar V operates or moves, the pins k k work the belt-shipper X, and the belt R is thrown for a time on the idle-pulley Q, and then on the working-pulley Q', and so on, the belt passing alternately around one pulley and then around the other. Thus it will be seen that the endless apron has an intermitting motion.

Y Y are rods attached to the end of the slide or bar V, said rods being placed obliquely with the slide, precisely as shown in Fig. 1. These rods pass through eyes l l on the slides E F, and, owing to the position of the rods, a reciprocating motion is communicated to the slides E F, and the binding-hooks D D D' D' are brought together and moved apart as the slides operate.

Operation: As the machine is moved along the cutters or teeth cut the grain in the usual manner and the grain falls over upon the endless apron C. The small ribs or projections e on the under surface of the teeth prevent the fingers from clogging by keeping the slots of the fingers perfectly clean. The grain that falls upon the apron C is carried up at intervals and in proper quantity to the binding-hooks D D D' D', in consequence of the intermitting motion of the belt C. The binding-hooks, as they close, compress the straw of the grain, and operatives on the rear of the machine pass a band around the sheaves grasped by the hooks and secure them. The bands are placed in recesses m m, just back of the binding-hooks, and the operatives secure a band around the sheaf that is being pressed by a pair of hooks, there being a recess behind each pair of hooks. The sheaves being bound are carried off the machine by means of the rollers Z.

I do not claim the slotted fingers, nor the teeth e; neither do I claim an endless belt irrespective of the peculiar motion communicated to it; but,

Having thus described the nature and operation of my invention, what I claim as new, and desire to secure by Letters Patent, is—

1. Giving the endless apron C an intermitting motion for the purpose of carrying the grain to the binding-hooks at intervals and in proper quantity, said motion being communicated to the apron by means of belt-shipper X, worked automatically from some moving portion of the machine, substantially as described.

2. Gathering the grain in bundles or sheaves by means of the binding-hooks D D D' D', or their equivalents, said binding-hooks being arranged and operating in the manner as shown, motion being communicated to them by means of the reciprocating bars E F, substantially as described.

3. The binding-hooks D D D' D', in combination with the endless intermittently-moving apron C, the hooks and apron being constructed, arranged, and operating in the manner and for the purpose substantially as herein set forth.

JOSEPH E. NESEN.

Witnesses:
O. D. MUNN,
S. H. WALES.